Patented Nov. 21, 1950

2,531,283

UNITED STATES PATENT OFFICE 2,531,283

PREPARATION OF THIOACETAMIDE

Charles L. Levesque, Philadelphia, Pa., assignor to Rohm & Haas Company, Philadelphia, Pa., a corporation of Delaware No Drawing. Application June 23, 1948, Serial No. 34,810

8 Claims. (Cl. 260—551)

This invention relates to a method of preparing thioacetamides and dithiooxalodiamides having, respectively, the general formulas

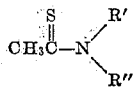

and

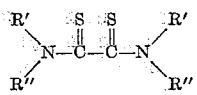

in which R' and R'' represent hydrogen atoms or monovalent organic radicals, preferably hydrocarbon radicals, as are described in greater detail below.

The invention relates to a process which comprises reacting under anhydrous conditions and at a temperature of 80° C. to 300° C. a vinyl ether or ester, elemental sulfur, and an amino compound having the formula HNR'R'', in which R' and R'' represent hydrogen atoms or monovalent organic radicals, preferably hydrocarbon radicals.

It is known that compounds having a carbonyl group such as aldehydes and ketones react with sulfur and ammonia or amines to form amides. It is also known that olefin hydrocarbons react with sulfur and amines to produce thioamides. It has now been found that vinyl ethers and esters react with sulfur, ammonia, and primary amines or secondary amines to form thioamides, presumably according to the following typical equations:

1   R·O·CH=CH$_2$ + S + HNR'R''

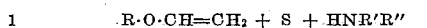

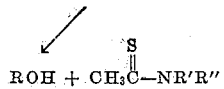

2   R·O·CH=CH$_2$ + 4S + 2HNR'R''

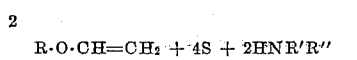

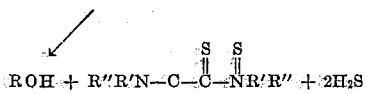

3   RCOOCH=CH$_2$ + S + 2HNR'R''

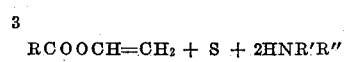

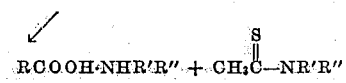

4   RCOOCH=CH$_2$ + 4S + 3HNR'R''

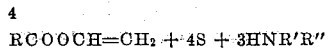

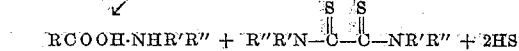

Equations 1 and 2 illustrate, respectively, the formation of thioacetamides and dithiooxalodiamides from vinyl ethers while Equations 3 and 4 illustrate the use of vinyl esters for the same purpose. In all of the equations the character R represents a monovalent organic radical, preferably a hydrocarbon radical such as a lower alkyl group.

This invention is based on the discovery of a new chemical reaction in which thioamides are produced from vinyl compounds, sulfur, and amino compounds. The reaction yields a class of componds; namely, thioamides. The individual members of this class differ from each other in two ways. Thus, they may be substituted thioacetamides or substituted dithiooxalodiamides. Furthermore, they can differ in regards to the particular groups which are attached to the amino-nitrogen atoms and which are represented by R' or R'' above.

When the characters R' and R'' represent hydrogen atoms, the amino compound, of course, is ammonia and the reaction products are thioacetamide and dithiooxalodiamide per se. When one of the characters, R' or R'', represents an organic radical and the other a hydrogen atom, as is the case with primary amines, the products are mono-N-substituted thioacetamides and dithiooxalodiamides. It follows that, when both R' and R'' represent organic radicals, preferably hydrocarbon radicals, the amine is a secondary one and the products are di-N-substituted. Thus, the structure of the product is directly dependent upon the structure of the amino compound which is employed as reactant. The amines which react well and are preferred are those in which the amino-nitrogen is attached to an aliphatic carbon atom such as those in which R' and R'' are hydrocarbon radicals or groups from the class consisting of alkyl, cycloalkyl, and aralkyl radicals. R' and R'' can represent the same or different hydrocarbon groups within the classes noted above. It is further understood that the hydrocarbon radicals represented by R' and R'' are free of aliphatic unsaturation; that is, they do not contain double or triple bonds in the aliphatic positions thereof. Examples of operable amines include the following: Methylamine, dimethylamine, methylethylamine, laurylamine, butyloctylamines, octadecylamines, dioctadecylamines, cyclohexylamine, dicyclohexylamine, methylcyclohexylamine, ethylbenzylamine, beta-phenethylamine, di-beta-phenethylamine, and the like.

The vinyl ethers and esters behave alike in the reaction of this invention. For simplicity, they may be thought of as a class having the general formula, M—O—CH=CH$_2$, in which M represents an acyl group, RCO, or a hydrocarbon group, R. During the reaction, the groups represented by M—O remain intact and the vinyl group becomes the nucleus for the formation of the resultant thioamides. More specifically, it is apparent from the equations shown above that an alcohol or an acid is produced, depending on whether a vinyl ether or a vinyl ester is employed. Thus, a compound, M·O·H, is formed together with the thioamides, and such a compound can readily be converted to the original vinyl compound, M·O·CH=CH$_2$, by conventional means.

Since the alcohol or acid is recovered, there is little point in employing vinyl ethers or esters which are costly or are difficult to obtain. Therefore, the preferred class of ethers and esters are those in which R is a monovalent hydrocarbon radical. The group, R, may, if desired, even contain other substituents such as a halogen but, from the standpoint of efficiency and economy, it is preferred that R be an unsubstituted, monovalent hydrocarbon group such as an alkyl, cycloalkyl, or aralkyl group, and particularly an alkyl group of one to about eight carbon atoms. It is understood, as in the case of the groups represented by R' and R'', that the groups represented by R are free of aliphatic unsaturation and do not contain double or triple bonds in the aliphatic portions thereof. Examples of such groups, R, are the following: Methyl, ethyl, propyl, n-butyl, isobutyl, octyl, iso-octyl, sec.-octyl, di-tert.-butyl, dodecyl, octadecyl, cyclohexyl, methylcyclohexyl, benzyl, hexahydrophenylmethyl, and the like. Thus, operable vinyl ethers include vinyl methyl ether, vinyl butyl ether, vinyl iso-octyl ether, vinyl benzyl ether, vinyl cyclohexyl ether, while operable vinyl esters include vinyl acetate, vinyl propionate, vinyl butyrate, vinyl benzoate, vinyl phenylacetate, vinyl hexahydrobenzoate, and vinyl methylbenzoates.

Both thioacetamides and dithiooxalodiamides are produced by the process of this invention. The relative yield of each is determined largely by the duration of the reaction. It is believed that the thioacetamide is first formed and that this in turn reacts with additional sulfur and amine to form the corresponding dithiooxalodiamide. This belief is supported by the fact that an isolated thioacetamide reacts with sulfur and an amine to form dithiooxalodiamides as is shown in Example 5 below.

The reactions which take place at temperatures from 80° C. to 300° C., and preferably from 100° C. to 150° C., may be carried out in the presence of an anhydrous solvent such as dioxane or pyridine. The reactions are always conducted under substantially anhydrous conditions.

It is also desirable to employ an excess of sulfur and the amino compound over that amount required by the reactions set forth in Equations 1 to 4 above. When gaseous or low-boiling reactants such as ammonia or methylamine are employed, it is advantageous to carry out the reaction under pressure.

The process of this invention is illustrated by the following examples.

Example 1

A mixture of 198 grams of cyclohexylamine, 64 grams of sulfur, and 250 cc. of dioxane was placed in a three-necked flask equipped with thermometer, stirrer, and reflux condenser and was heated to refluxing temperature (110° C.). Fifty grams of vinyl butyl ether was added over a period of thirty minutes while the mixture was refluxed. Refluxing was thereafter continued for five and one-half hours, after which the mixture was cooled and poured into 20 cc. of V. M. & P. naphtha. This mixture was chilled in a refrigerator during which time orange crystals of N,N'-dicyclohexyldithiooxalodiamide separated. These were filtered off and, on being dried, weighed 42.3 grams and melted at 155°–159° C. When recrystallized from butanol the product melted at 156°–158° C. and analyzed as follows: Nitrogen content, 9.88%; sulfur content, 22.06%; molecular weight, 274. The corresponding values calculated for N,N'-dicyclohexyldithiooxalodiamide are: Nitrogen content, 9.86%; sulfur content, 22.5%; molecular weight, 284.

Example 2

The equipment and procedure described in Example 1 were employed in this example. A mixture of 198 grams of cyclohexylamine, 64 grams of sulfur, and 250 cc. of dioxane was heated to refluxing temperature and at this point 50 grams of vinyl butyl ether was added over a period of thirty minutes. Refluxing was continued for nine hours after which the mixture was cooled, added to 20 cc. of V. M. & P. naphtha and chilled in a refrigerator overnight. The crystals which separated were filtered off and dried. They weighed 43.8 grams and, on being recrystallized from butanol, were identical with the product of Example 1.

The filtrate from which the crude crystals had been removed by filtration was mixed with 400 cc. of chloroform. This solution was washed with water, then with dilute hydrochloric acid, and again with water. Precipitated sulfur was removed by filtration. The filtrate was then evaporated to dryness, the residue was taken up in three times its volume of methanol and this mixture was filtered. The residue, on being dried, weighed 25 grams. It was taken up in butanol and filtered. The butanol and methanol solutions were combined, stripped, and distilled in vacuo. There was obtained 23.4 grams of pale yellow liquid (B. P. 126°–142° C./4 mm.) which solidified to yellowish crystals (M. P. 49°–58° C.). One refractionation gave a good recovery of nearly colorless crystals, M. P. 75.3°–78.0° C., which were identified as N-cyclohexylthioacetamide. The total yield, based on the vinyl butyl ether, was 56.6%, consisting of a 31% yield of N,N'-dicyclohexyldithiooxalodiamide and a 25.6% yield of N-cyclohexylthioacetamide.

Example 3

The procedural steps of Example 2 were repeated with one exception; namely, that the reaction mixture was refluxed only one-half hour after the vinyl butyl ether had been added. The total yield in this case was 67.6% based on the vinyl ether and consisted of a 12.4% yield of N,N'-cyclohexyldithiooxalodiamide and a 55.2% yield of N-cyclohexylthioacetamide.

Example 4

A mixture of 92.5 grams of dodecylamine, 20 grams of sulfur and 250 cc. of dioxane was placed in a three-necked flask equipped with mechanical stirrer, thermometer, and reflux condenser. The mixture was heated to refluxing temperature and at this point 25 grams of vinyl butyl ether was added. Refluxing was continued for four hours, after which the mixture was distilled until 200 cc. of distillate had been removed. The residue was cooled to 80° C. and poured into 20 cc. of V. M. & P. naphtha. This mixture was chilled overnight and was filtered. The impure crystals, thus obtained, weighed 66 grams when dry. They were dissolved in 480 cc. of hot butanol, and bone black was added. This mixture was filtered and the filtrate allowed to cool. Orange crystals formed and were separated by filtration. These crystals melted at 52°–53° C. and, as the following analysis indicates, were N,N'-di(dodecyl-)dithiooxalodiamide: Nitrogen content, 6.17%; sulfur content, 13.7%; molecular weight, 452. The corresponding values calculated for N,N'-di(dodecyl-)dithiooxalodiamide are: Nitrogen content, 6.14%; sulfur content, 14.0%; molecular weight, 456.

The filtrate from which the crude crystals of N,N'-di(dodecyl-)dithiooxalodiamide had been removed was treated by the procedure described in Example 2 and a small amount of N-dodecylthioacetamide was isolated and its composition was confirmed by analysis.

Example 5

A mixture of 15.7 grams of N-cyclohexylthioacetamide, 39.6 grams of cyclohexylamine, and 8 grams of sulfur was heated at refluxing temperature for seven hours during which time hydrogen sulfide was liberated. The mixture was then cooled, dissolved in 100 cc. of chloroform, and this solution was washed with water, then with dilute hydrochloric acid and again with water. The chloroform was distilled off and the residue was taken up in 100 cc. of methanol. The insoluble crystals were filtered off and dried. They weighed 6.6 grams. After recrystallization from butanol the product was identified as N,N'-dicyclohexyldithiooxalodiamide.

The thioamides of this invention are useful as chemical intermediates, insecticides, and accelerators.

I claim:

1. The process of preparing a mixture of thioacetamides and dithiooxalodiamides which comprises reacting under anhydrous conditions and at a temperature from 80° C. to 300° C. (a) sulfur, (b) a member of the class consisting of vinyl ethers and vinyl esters having, respectively, the formulas R·O·CH=CH$_2$ and RCOOCH=CH$_2$ in which R is a monovalent hydrocarbon radical from the class consisting of alkyl, cycloalkyl, and aralkyl groups, and (c) an amino compound of the formula HNR'R'' in which R' and R'' are members of the class consisting of hydrogen atoms and alkyl, cycloalkyl, and aralkyl radicals.

2. The process of preparing a mixture of thioacetamide and dithiooxalodiamides which comprises reacting under anhydrous conditions and at a temperature from 100° C. to 150° C. (a) sulfur, (b) a member of the class consisting of vinyl ethers and vinyl esters having, respectively, the formulas R·O·CH=CH$_2$ and RCOOCH=CH$_2$ in which R is a monovalent hydrocarbon radical from the class consisting of alkyl, cycloalkyl, and aralkyl groups, and (c) an amino compound of the formula HNR'R'' in which R' and R'' are members of the class consisting of hydrogen atoms and alkyl, cycloalkyl, and aralkyl radicals.

3. The process of preparing a mixture of thioacetamides and dithiooxalodiamides which comprises reacting under anhydrous conditions and at a temperature from 100° C. to 150° C. (a) sulfur, (b) an alkyl vinyl ether, and (c) an amino compound of the formula R'R''NH in which R' and R'' are memers of the class consisting of hydrogen atoms and alkyl, cycloalkyl, and aralkyl radicals.

4. The process of preparing a mixture of thioacetamides and dithiooxalodiamides which comprises reacting under anhydrous conditions and at a temperature from 100° C. to 150° C. (a) sulfur, (b) a vinyl ester of a saturated, unsubstituted aliphatic carboxylic acid, and (c) an amino compound of the formula R'R''NH in which R' and R'' are members of the class consisting of hydrogen atoms and alkyl, cycloalkyl, and aralkyl radicals.

5. The process of preparing a mixture of thioacetamides and dithiooxalodiamides which comprises reacting under anhydrous conditions and at a temperature from 100° C. to 150° C. (a) sulfur, (b) an alkyl vinyl ether, and (c) a primary amine of the formula R'NH$_2$ in which R' is an alkyl group.

6. The process of preparing a mixture of thioacetamides and dithiooxalodiamides which comprises reacting under anhydrous conditions and at a temperature from 100° C. to 150° C. (a) sulfur, (b) an alkyl vinyl ether, and (c) a secondary amine of the formula R'R''NH in which R' and R'' are alkyl groups.

7. The process of preparing a mixture of thioacetamides and dithiooxalodiamides which comprises reacting under anhydrous conditions and at a temperature from 100° C. to 150° C. (a) sulfur, (b) a vinyl ester of a saturated, unsubstituted, aliphatic, carboxylic acid, and (c) a primary amine of the formula R'NH$_2$ in which R' is an alkyl group.

8. The process of preparing a mixture of thioacetamides and dithiooxalodiamides which comprises reacting under anhydrous conditions and at a temperature from 100° C. to 150° C. (a) sulfur, (b) a vinyl ester of a saturated, unsubstituted, aliphatic, carboxylic acid, and (c) a secondary amine of the formula R'R''NH in which R' and R'' are alkyl groups.

CHARLES L. LEVESQUE.

REFERENCES CITED

The following references are of record in the file of this patent:

UNITED STATES PATENTS

| Number | Name | Date |
| --- | --- | --- |
| 2,495,567 | Carmack et al. | Jan. 24, 1950 |

OTHER REFERENCES

King et al.: "J. Am. Chem. Soc.," vol. 68, July 1946, pp. 1369–1373.

Pattison et al.: "J. Am. Chem. Soc.," vol. 68, Oct. 1946, pp. 2033–2035.

Davis et al.: "J. Org. Chem.," vol. 12, Jan. 1947, pp. 76 and 77.

Certificate of Correction

Patent No. 2,531,283                                      November 21, 1950

CHARLES L. LEVESQUE

It is hereby certified that error appears in the above numbered patent requiring correction as follows:

In the grant, line 6, title of invention, for "THE PREPARATION OF THIOACETAMIDE" read *THE PREPARATION OF THIOACETAMIDES*; column 1, formula 2, lines 47 to 49, inclusive, for that portion of the equation reading and that the said Letters Patent should be read as corrected above, so that the same may conform to the record of the case in the Patent Office.

Signed and sealed this 23rd day of January, A. D. 1951.

[SEAL]

THOMAS F. MURPHY,
                                                     *Assistant Commissioner of Patents.*